United States Patent
Dunn et al.

(10) Patent No.: US 11,142,863 B2
(45) Date of Patent: Oct. 12, 2021

(54) CONTROLLING REFRIGERANT AND AIR MASS FLOW RATE BASED ON MOISTURE EXTRACTION RATE IN A DRYER APPLIANCE

(71) Applicant: Haier US Appliance Solutions, Inc., Wilmington, DE (US)

(72) Inventors: David Scott Dunn, Louisville, KY (US); Jivko Ognianov Djerekarov, Louisville, KY (US); Brian Michael Schork, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 125 days.

(21) Appl. No.: 16/659,900

(22) Filed: Oct. 22, 2019

(65) Prior Publication Data
US 2021/0115619 A1 Apr. 22, 2021

(51) Int. Cl.
| | | |
|---|---|---|
| *F26B 7/00* | (2006.01) |
| *D06F 58/20* | (2006.01) |
| *F26B 21/08* | (2006.01) |
| *D06F 58/24* | (2006.01) |
| *D06F 58/38* | (2020.01) |
| *D06F 103/08* | (2020.01) |
| *D06F 103/36* | (2020.01) |
| *D06F 103/50* | (2020.01) |

(Continued)

(52) U.S. Cl.
CPC ............ *D06F 58/206* (2013.01); *D06F 58/24* (2013.01); *F26B 21/086* (2013.01); *D06F 58/38* (2020.02); *D06F 2103/08* (2020.02); *D06F 2103/36* (2020.02); *D06F 2103/50* (2020.02); *D06F 2105/24* (2020.02); *D06F 2105/26* (2020.02)

(58) Field of Classification Search
CPC ........ D06F 58/206; D06F 58/24; D06F 58/38; D06F 2103/08; D06F 2103/50; D06F 2103/36; D06F 2105/26; D06F 2105/24; F26B 21/086
USPC .................... 34/427, 407, 449, 468, 469, 73
See application file for complete search history.

(56) References Cited

U.S. PATENT DOCUMENTS

| 3,508,340 A | 4/1970 | Kombol |
| 7,665,225 B2 | 2/2010 | Goldberg et al. |
| 8,683,713 B2 | 4/2014 | Ha et al. |

(Continued)

FOREIGN PATENT DOCUMENTS

EP    1916326 A1    4/2008

*Primary Examiner* — John P Mccormack
(74) *Attorney, Agent, or Firm* — Dority & Manning, P.A.

(57) ABSTRACT

A dryer appliance and a method of operating the same are provided. In one aspect, the dryer appliance includes a drum rotatably mounted within a cabinet. The drum defines a chamber that is in fluid communication with a conditioning system of the dryer appliance. The conditioning system heats air circulating therethrough and removes water from the process air. A collection tank collects the water and a drain pump removes water from the collection tank intermittently when the water reaches a predetermined level. The frequency at which the drain pump removes water from the collection tank is utilized to determine the moisture extraction rate indicative of the rate at which moisture is removed from the clothes. The moisture extraction rate is utilized to control the mass flow rate of refrigerant in a heat pump sealed system or the process air flow rate through the closed loop air circuit.

18 Claims, 6 Drawing Sheets

(51) Int. Cl.
*D06F 105/24* (2020.01)
*D06F 105/26* (2020.01)

(56) References Cited

U.S. PATENT DOCUMENTS

| | | | |
|---|---|---|---|
| 10,100,460 B2 * | 10/2018 | Bisaro .................. | D06F 58/206 |
| 2011/0289796 A1 * | 12/2011 | Ha ......................... | D06F 58/24 34/468 |
| 2015/0345072 A1 * | 12/2015 | Ko ....................... | D06F 58/203 34/493 |

* cited by examiner

CONTROLLING REFRIGERANT AND AIR MASS FLOW RATE BASED ON MOISTURE EXTRACTION RATE IN A DRYER APPLIANCE

FIELD OF THE INVENTION

The present subject matter relates generally to dryer appliances, and more particularly to operating closed loop airflow circuit dryer appliances based on moisture extraction rate.

BACKGROUND OF THE INVENTION

Closed loop airflow circuit dryer appliances can efficiently dry laundry articles. Example closed loop airflow circuit dryer appliances include condenser dryers, heat pump dryers, and spray tower dryer appliances. Such dryer appliances include a closed loop airflow circuit along which process air is moved. The process air is conditioned by a conditioning system, e.g., to remove moisture from the process air after the air has absorbed water from articles and also heats the air to increase the moisture capacity of the air.

Despite the efficiency of such dryer appliances, some efficiency challenges remain. For instance, in some instances heat pump dryer appliances can have excess refrigeration capacity at the evaporator of the sealed system of the heat pump, which negatively affects system efficiency. Stated another way, the evaporator capacity can be in excess of the process air enthalpy load. Moreover, electrical energy consumed by a heat pump dryer appliance is ultimately rejected to its surrounding environment. Lower efficiency results in more waste heat rejected to the surrounding environment. In addition, the moisture within articles diminishes over the drying cycle, and at some point during the cycle, the dryer appliance removes water from the process air faster than the articles can dissipate moisture to the air. Accordingly, the efficiency of such dryer appliances can diminish at the end of a drying cycle. Current dryer appliances do not account for such inefficiencies toward the end of drying cycles and thus operate inefficiently.

In addition, fabrics used in laundry articles have different materials and fiber structures, which dictate the energy required to remove moisture from the fabric during a drying cycle. Thus, for constant heating capacity, drying rates vary based on the type of fabrics used in the laundry articles. Many times the correct fabric type of the articles being dried is not selected despite the varying drying rates of fabrics. As a result, many times articles are dried with suboptimal settings.

Accordingly, a dryer appliance and methods of operating the same that address one or more of the challenges noted above would be advantageous.

BRIEF DESCRIPTION OF THE INVENTION

Aspects and advantages of the invention will be set forth in part in the following description, or may be obvious from the description, or may be learned through practice of the invention.

In one aspect, a dryer appliance is provided. The dryer appliance includes a cabinet and a drum rotatably mounted within the cabinet. The drum defines a chamber for receipt of articles for drying. The drum also defines a drum outlet and a drum inlet to the chamber. Further, the dryer appliance includes a conditioning system configured to heat and remove moisture from process air flowing therethrough. The dryer appliance also includes a duct system for providing fluid communication between the drum outlet and the conditioning system and between the conditioning system and the drum inlet. The duct system, the conditioning system, and the chamber of the drum define a process air flowpath. Moreover, the dryer appliance includes a blower fan operable to move process air along the process air flowpath. The dryer appliance also includes a collection tank in fluid communication with the conditioning system for receiving condensate water from process air flowing through the conditioning system. The dryer appliance further includes a controller. The controller can include one or more processors and one or more memory devices, such as one or more non-transitory computer readable medium. Wherein during a drying cycle, the controller is configured to: receive an input indicative of a rate at which water is removed from process air by the conditioning system; determine a moisture extraction rate indicative of a rate at which moisture is removed from articles within the chamber based at least in part on the received input indicative of the rate at which water is removed from process air by the conditioning system; and cause adjustment of one or more drying cycle settings based at least in part on the determined moisture extraction rate.

In another aspect, a dryer appliance is provided. The dryer appliance includes a cabinet and a drum rotatably mounted within the cabinet, the drum defining a chamber for receipt of articles for drying, the drum defining a drum outlet and a drum inlet to the chamber. Further, the dryer appliance includes a conditioning system configured to heat and remove moisture from process air flowing therethrough. The dryer appliance also includes a duct system for providing fluid communication between the drum outlet and the conditioning system and between the conditioning system and the drum inlet, the duct system, the conditioning system, and the drum defining a process air flowpath. The dryer appliance further includes a blower fan operable to move process air along the process air flowpath. In addition, the dryer appliance includes a collection tank in fluid communication with the conditioning system for receiving condensate water from process air flowing through the conditioning system. The dryer appliance also includes a drain pump in fluid communication with the collection tank and operable to remove a volume of water from the collection tank. Moreover, the dryer appliance includes a controller communicatively coupled with the drain pump, and during a drying cycle. The controller is configured to: receive an input indicative of a pump activation frequency of the drain pump; determine a moisture extraction rate indicative of a rate at which moisture is removed from articles within the chamber based at least in part on the pump activation frequency; and cause adjustment of one or more drying cycle settings based at least in part on the determined moisture extraction rate.

In another aspect, a dryer appliance is provided. The dryer appliance includes a cabinet and a drum rotatably mounted within the cabinet, the drum defining a chamber for receipt of articles for drying, the drum defining a drum outlet and a drum inlet to the chamber. The dryer appliance also includes a conditioning system configured to heat and remove moisture from process air flowing therethrough, the conditioning system having a sealed system along which a working fluid flows. Further, the dryer appliance includes a duct system for providing fluid communication between the drum outlet and the conditioning system and between the conditioning system and the drum inlet, the duct system, the conditioning system, and the drum defining a process air flowpath. Moreover, the dryer appliance includes a blower fan operable to move process air along the process air flowpath. In addition, the dryer appliance includes a collection tank in fluid communication with the conditioning system for receiving condensate water from process air flowing through the conditioning system. The dryer appliance also includes a drain pump in fluid communication with the collection tank and operable to remove a volume of water from the collection tank. Moreover, the dryer appliance includes a controller communicatively coupled with the drain pump, and during a drying cycle. The controller is configured to: receive an input indicative of a pump activation frequency of the drain pump; determine a moisture extraction rate indicative of a rate at which moisture is removed from articles within the chamber based at least in part on the pump activation frequency; and cause adjustment of a mass flow rate of the working fluid flowing along the sealed system based at least in part on the determined moisture extraction rate.

In another aspect, a method of operating a dryer appliance in a drying cycle is provided. The method includes receiving, by a controller of the dryer appliance, an input indicative of a pump activation frequency of a drain pump, wherein when the drain pump is activated, the drain pump removes water from a collection tank that collects water from process air flowing along a closed loop air circuit of the dryer appliance. The method also includes determining, by the controller, a moisture extraction rate indicative of a rate at which moisture is removed from articles within a chamber of a drum based at least in part on the received input indicative of the pump activation frequency. The method also includes causing, by the controller, adjustment of one or more drying cycle settings based at least in part on the determined moisture extraction rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
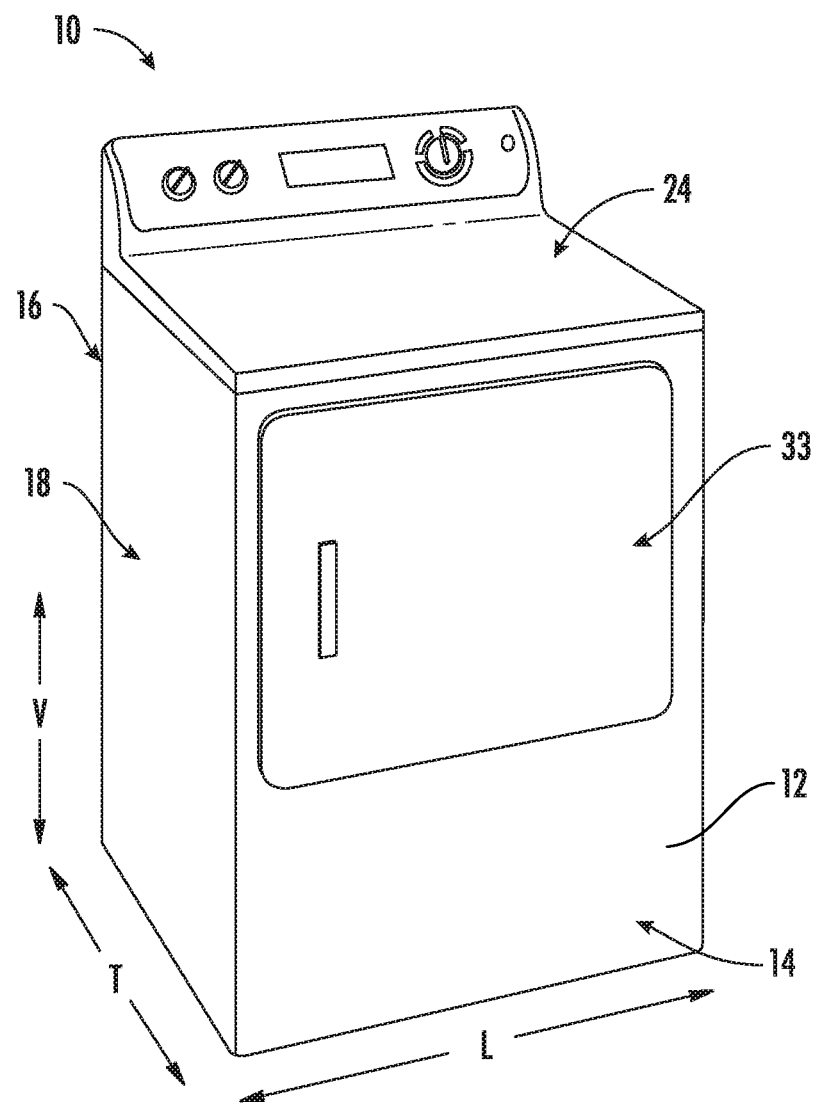
FIG. 1 provides a perspective view of a dryer appliance in accordance with exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
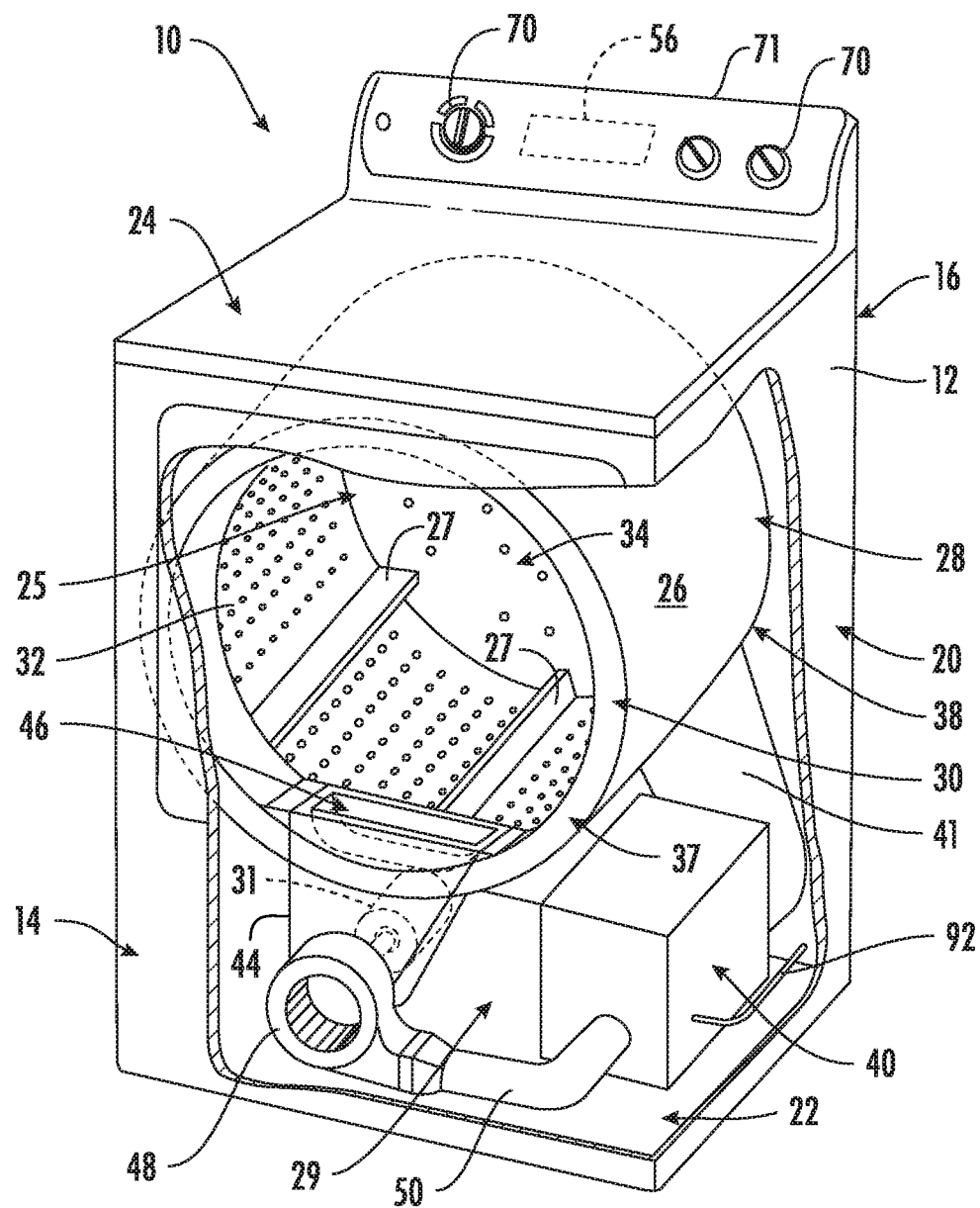
FIG. 2 provides a perspective view of the example dryer appliance of FIG. 1 with portions of a cabinet of the dryer appliance removed to reveal certain components of the dryer appliance.

FIGS. 1 and 2 provide perspective views of a dryer appliance 10 according to exemplary embodiments of the present disclosure. Particularly, FIG. 1 provides a perspective view of dryer appliance 10 and FIG. 2 provides another perspective view of dryer appliance 10 with a portion of a housing or cabinet 12 of dryer appliance 10 removed in order to show certain components of dryer appliance 10. As depicted, dryer appliance 10 defines a vertical direction V, a lateral direction L, and a transverse direction T, each of which is mutually perpendicular such that an orthogonal coordinate system is defined. While described in the context of a specific embodiment of dryer appliance 10, using the teachings disclosed herein it will be understood that dryer appliance 10 is provided by way of example only. Other dryer appliances having different appearances and different features may also be utilized with the present subject matter as well. For instance, in some embodiments, dryer appliance 10 can be a combination washing machine/dryer appliance.

Cabinet 12 includes a front panel 14, a rear panel 16, a pair of side panels 18 and 20 spaced apart from each other by front and rear panels 14 and 16 along the lateral direction L, a bottom panel 22, and a top cover 24. Cabinet 12 defines an interior volume 29. A drum or container 26 is mounted for rotation about a substantially horizontal axis within the interior volume 29 of cabinet 12. Drum 26 defines a chamber 25 for receipt of articles for tumbling and/or drying. Drum 26 extends between a front portion 37 and a back portion 38, e.g., along the transverse direction T. Drum 26 also includes a back or rear wall 34, e.g., at back portion 38 of drum 26. A supply duct 41 may be mounted to rear wall 34. Supply duct 41 receives heated air that has been heated by a conditioning system 40 and provides the heated air to drum 26 via one or more holes defined by rear wall 34.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 10 (e.g., clothes dryer) and may include a mixture of different or similar articles of clothing of different or similar types and kinds of fabrics, textiles, garments and linens within a particular laundering process.

In some embodiments, a motor 31 is provided to rotate drum 26 about the horizontal axis, e.g., via a pulley and a belt (not pictured). Drum 26 is generally cylindrical in shape. Drum 26 has an outer cylindrical wall 28 and a front flange or wall 30 that defines an opening 32 of drum 26, e.g., at front portion 37 of drum 26, for loading and unloading of articles into and out of chamber 25 of drum 26. Drum 26 includes a plurality of lifters or baffles 27 that extend into chamber 25 to lift articles therein and then allow such articles to tumble back to a bottom of drum 26 as drum 26 rotates. Baffles 27 may be mounted to drum 26 such that baffles 27 rotate with drum 26 during operation of dryer appliance 10.

Rear wall 34 of drum 26 is rotatably supported within cabinet 12 by a suitable bearing. Rear wall 34 can be fixed or can be rotatable. Rear wall 34 may include, for instance, a plurality of holes that receive hot air that has been heated by a conditioning system 40, e.g., a heat pump or refrigerant-based conditioning system as will be described further below. Moisture laden, heated air is drawn from drum 26 by an air handler, such as a blower fan 48, which generates a negative air pressure within drum 26. The moisture laden heated air passes through a duct 44 enclosing screen filter 46, which traps lint particles. As the air passes from blower fan 48, it enters a duct 50 and then is passed into conditioning system 40. In some embodiments, the conditioning system 40 may be or include an electric heating element, e.g., a resistive heating element, or a gas-powered heating element, e.g., a gas burner. For this embodiment, dryer appliance 10 is a heat pump dryer appliance and thus conditioning system 40 may be or include a heat pump including a sealed refrigerant circuit, as described in more detail below with reference to FIG. 3. Heated air (with a lower moisture content than was received from drum 26), exits conditioning system 40 and returns to drum 26 by duct 41. After the clothing articles have been dried, they are removed from the drum 26 via opening 32. A door 33 provides for closing or accessing drum 26 through opening 32.

In some embodiments, one or more selector inputs 70, such as knobs, buttons, touchscreen interfaces, etc., may be provided or mounted on a cabinet 12 (e.g., on a backsplash 71) and are communicatively coupled with (e.g., electrically coupled or coupled through a wireless network band) a processing device or controller 56. Controller 56 may also be communicatively coupled with various operational components of dryer appliance 10, such as motor 31, blower 48, and/or components of conditioning system 40. In turn, signals generated in controller 56 direct operation of motor 31, blower 48, or conditioning system 40 in response user inputs to selector inputs 70. As used herein, "processing device" or "controller" may refer to one or more microprocessors, microcontroller, ASICS, or semiconductor devices and is not restricted necessarily to a single element. The controller 56 may be programmed to operate dryer appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controller 56 as disclosed herein is capable of and may be operable to perform any methods or associated method steps as disclosed herein. For example, in some embodiments, methods disclosed herein may be embodied in programming instructions stored in the memory and executed by the controller 56.

Figure 3:
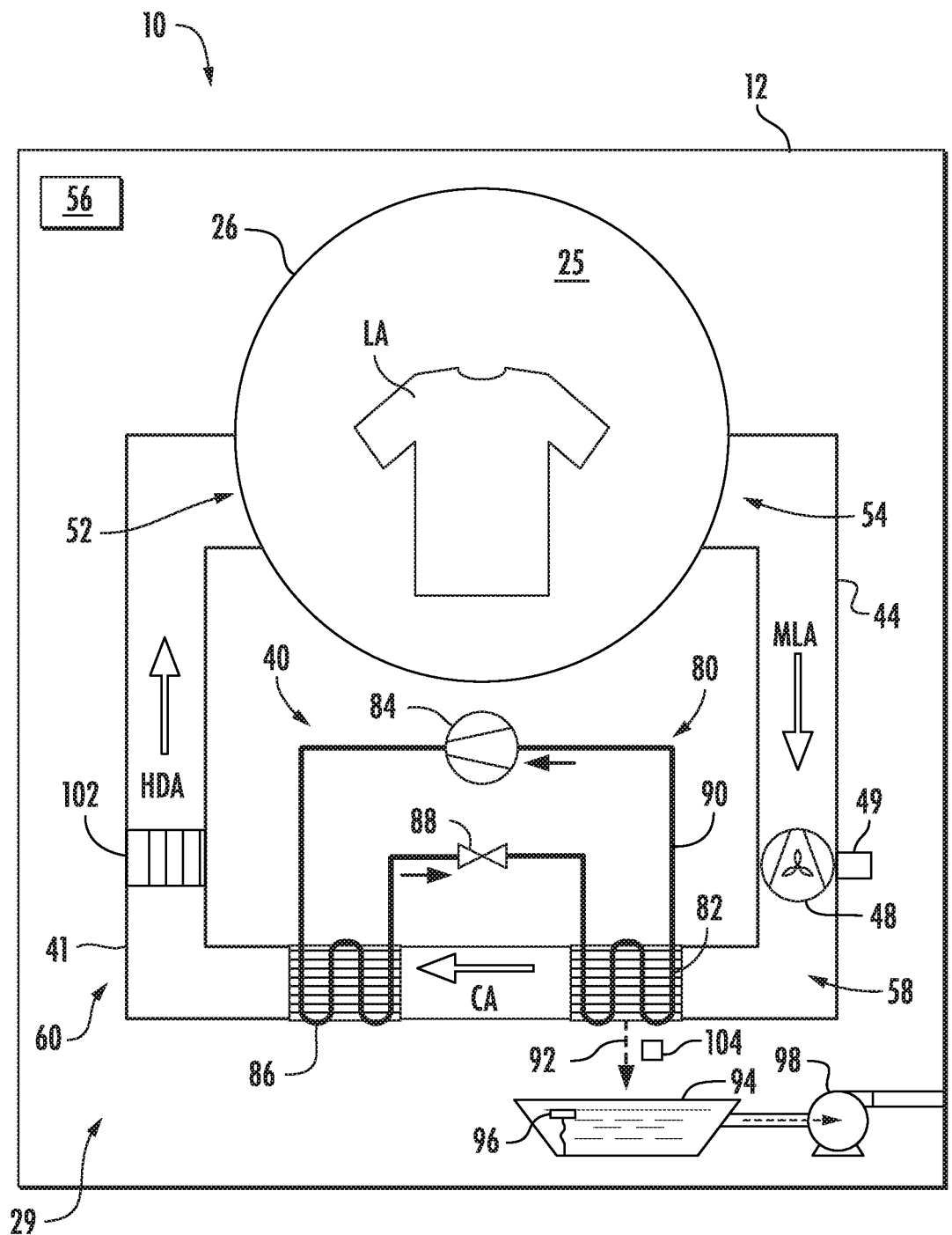
FIG. 3 provides a schematic diagram of an exemplary heat pump dryer appliance and a conditioning system thereof in accordance with exemplary embodiments of the present disclosure.

FIG. 3 provides a schematic view of dryer appliance 10 and depicts conditioning system 40 in more detail. For this embodiment, dryer appliance 10 is a heat pump dryer appliance and thus conditioning system 40 includes a sealed system 80. Sealed system 80 includes various operational components, which can be encased or located within a machinery compartment of dryer appliance 10. Generally, the operational components are operable to execute a vapor compression cycle for heating process air passing through conditioning system 40. The operational components of sealed system 80 include an evaporator 82, a compressor 84, a condenser 86, and one or more expansion devices 88 connected in series along a refrigerant circuit or line 90. Refrigerant line 90 is charged with a working fluid, which in this example is a refrigerant. Sealed system 80 depicted in FIG. 3 is provided by way of example only. Thus, it is within the scope of the present subject matter for other configurations of the sealed system to be used as well. As will be understood by those skilled in the art, sealed system 80 may include additional components, e.g., at least one additional evaporator, compressor, expansion device, and/or condenser. As an example, sealed system 80 may include two (2) evaporators.

In performing a drying and/or tumbling cycle, one or more laundry articles LA may be placed within the chamber 25 of drum 26. Hot dry air HDA is supplied to chamber 25 via duct 41. The hot dry air HDA enters chamber 25 of drum via a drum inlet 52 defined by drum 26, e.g., the plurality of holes defined in rear wall 34 of drum 26 as shown in FIG. 2. The hot dry air HDA provided to chamber 25 causes moisture within laundry articles LA to evaporate. Accordingly, the air within chamber 25 increases in water content and exits chamber 25 as warm moisture laden air MLA. The warm moisture laden air MLA exits chamber 25 through a drum outlet 54 defined by drum 26 and flows into duct 44.

After exiting chamber 25 of drum 26, the warm moisture laden air MLA flows downstream to conditioning system 40. Blower fan 48 moves the warm moisture laden air MLA, as well as the air more generally, through a process air flowpath 58 defined by drum 26, conditioning system 40, and the duct system 60. Thus, generally, blower fan 48 is operable to move air through or along the process air flowpath 58. Duct system 60 includes all ducts that provide fluid communication (e.g., airflow communication) between drum outlet 54 and conditioning system 40 and between conditioning system 40 and drum inlet 52. Although blower fan 48 is shown positioned between drum 26 and conditioning system 40 along duct 44, it will be appreciated that blower fan 48 can be positioned in other suitable positions or locations along duct system 60.

As further depicted in FIG. 3, the warm moisture laden air MLA flows into or across evaporator 82 of the conditioning system 40. As the moisture-laden air MLA passes across evaporator 82, the temperature of the air is reduced through heat exchange with refrigerant that is vaporized within, for example, coils or tubing of evaporator 82. This vaporization process absorbs both the sensible and the latent heat from the moisture-laden air MLA—thereby reducing its temperature. As a result, moisture in the air is condensed and such condensate water may be drained from conditioning system 40, e.g., using a drain line 92, which is also depicted in FIG. 2.

For this embodiment, a collection tank 94 is in fluid communication with conditioning system 40, e.g., via drain line 92. Collection tank 94 is operable to receive condensate water from the process air flowing through conditioning system 40, and more particularly, condensate water from evaporator 82. A sensor 96 operable to detect when water within collection tank 94 has reached a predetermined level. Sensor 96 can be any suitable type of sensor, such as a float switch as shown in FIG. 3. Sensor 96 can be communicatively coupled with controller 56, e.g., via a suitable wired or wireless communication link. A drain pump 98 is in fluid communication with collection tank 94. Drain pump 98 is operable to remove a volume of water from collection tank 94. In some embodiments, drain pump 98 can remove a known or predetermined volume of water from collection tank 94. Drain pump 98 can remove the condensate water from collection tank 94 and can move or drain the condensate water downstream, e.g., to a gray water collection system. Particularly, in some embodiments, controller 56 is configured to receive, from sensor 96, an input indicating that water within the collection tank has reached the predetermined level. In response to the input indicating that water within collection tank 94 has reached the predetermined level, controller 56 can cause drain pump 98 to remove the predetermined volume of water from collection tank 94.

Air passing over evaporator 82 becomes cooler than when it exited drum 26 at drum outlet 54. As shown in FIG. 3, cool air CA (cool relative to hot dry air HDA and moisture laden air MLA) flowing downstream of evaporator 82 is subsequently caused to flow across condenser 86, e.g., across coils or tubing thereof, which condenses refrigerant therein. The refrigerant enters condenser 86 in a gaseous state at a relatively high temperature compared to the cool air CA from evaporator 82. As a result, heat energy is transferred to the cool air CA at the condenser 86, thereby elevating its temperature and providing warm dry air HDA for resupply to drum 26 of dryer appliance 10. The warm dry air HDA passes over and around laundry articles LA within the chamber 25 of the drum 26, such that warm moisture laden air MLA is generated, as mentioned above. Because the air is recycled through drum 26 and conditioning system 40, dryer appliance 10 can have a much greater efficiency than traditional clothes dryers can where all of the warm, moisture-laden air MLA is exhausted to the environment.

With respect to sealed system 80, compressor 84 pressurizes refrigerant (i.e., increases the pressure of the refrigerant) passing therethrough and generally motivates refrigerant through the sealed refrigerant circuit or refrigerant line 90 of conditioning system 40. Compressor 84 may be communicatively coupled with controller 56 (communication lines not shown in FIG. 3). Refrigerant is supplied from the evaporator 82 to compressor 84 in a low pressure gas phase. The pressurization of the refrigerant within compressor 84 increases the temperature of the refrigerant. The compressed refrigerant is fed from compressor 84 to condenser 86 through refrigerant line 90. As the relatively cool air CA from evaporator 82 flows across condenser 86, the refrigerant is cooled and its temperature is lowered as heat is transferred to the air for supply to chamber 25 of drum 26.

Upon exiting condenser 86, the refrigerant is fed through refrigerant line 90 to expansion device 88. Although only one expansion device 88 is shown, such is by way of example only. It is understood that multiple such devices may be used. In the illustrated example, expansion device 88 is an electronic expansion valve, although a thermal expansion valve or any other suitable expansion device can be used. In additional embodiments, any other suitable expansion device, such as a capillary tube, may be used as well. Expansion device 88 lowers the pressure of the refrigerant and controls the amount of refrigerant that is allowed to enter the evaporator 82. Importantly, the flow of liquid refrigerant into evaporator 82 is limited by expansion device 88 in order to keep the pressure low and allow expansion of the refrigerant back into the gas phase in evaporator 82. The evaporation of the refrigerant in evaporator 82 converts the refrigerant from its liquid-dominated phase to a gas phase while cooling and drying the moisture laden air MLA received from chamber 25 of drum 26. The process is repeated as air is circulated along process air flowpath 58 while the refrigerant is cycled through sealed system 80, as described above.

Although dryer appliance 10 is depicted and described herein as a heat pump dryer appliance, the inventive aspects of the present disclosure can apply to other types of closed loop airflow circuit dryer appliances. For instance, in other embodiments, dryer appliance 10 can be a condenser dryer that utilizes an air-to-air heat exchanger instead of evaporator 82 and/or an electric heater may be provided instead of condenser 86. Thus, in such embodiments, the working fluid that interacts thermally with the process air may be air. In yet other embodiments, dryer appliance 10 can be a spray tower dryer appliance that utilizes a water-to-air heat exchanger instead of utilizing a sealed refrigerant. Thus, in such embodiments, the working fluid that interacts thermally with the process air may be water. Further, in some embodiments, dryer appliance 10 can be a combination washer/dryer appliance having a closed loop airflow circuit along which process air may flow for drying operations.

As noted previously, closed loop airflow circuit dryer appliances, such as the heat pump dryer appliance of FIG. 3, do not always run at optimal efficiency or take the fabric type of the articles within the drum into account during operation of a drying cycle. In accordance with the inventive aspects of the present disclosure, a dryer appliance is provided that includes features for determining the rate at which moisture is extracted from the process air (i.e., the moisture extraction rate) based at least in part on a pump activation frequency of the drain pump so that one or more drying cycle settings can be adjusted. For instance, as will be explained below, based on the pump activation frequency of drain pump 98, the moisture extraction rate can be determined by controller 56, and as a result, controller 56 can adjust the mass flow rate of the refrigerant flowing along sealed system 80 so that the evaporator capacity matches the process air enthalpy load. In addition, based on the pump activation frequency of drain pump 98, the moisture extraction rate can be determined by controller 56, and consequently, the fabric type of the articles within chamber 25 of drum 26 can be determined. One or more drying cycle settings can be adjusted based on the determined fabric type.

With reference to FIG. 3, generally, a drying cycle includes three (3) states or phases, including a warm up state, a steady state, and a diminished drying state. In the warm up state, the process air flowing along the closed loop process air flowpath 58 is brought to temperature by conditioning system 40, or more particularly for this embodiment, heat pump sealed system 80. With the temperatures and pressures of the process air and refrigerant relatively stabilized, the drying cycle transitions to the steady state phase of the cycle. The steady state phase of the drying cycle is indicative of a part of the drying cycle in which an article water dissipation rate exceeds the moisture extraction rate. The article water dissipation rate is a rate at which articles LA within chamber 25 of drum 26 dissipate water to the process air flowing along the process air flowpath 58. The moisture extraction rate is the rate at which moisture is removed or extracted from the process air, e.g., at evaporator 82. In the steady state phase of the drying cycle, controller 56 seeks to optimize (e.g., maximize) the moisture extraction rate. The diminished drying state of the drying cycle is indicative of a part of the drying cycle in which the moisture extraction rate exceeds the article water dissipation rate.

Inefficiency can result during the diminished drying state when evaporator 82 has unusable capacity. However, in accordance with the inventive aspects of the present disclosure, dryer appliance 10 can make adjustments to one or more one or more drying cycle settings to address such inefficiencies. Operation of dryer appliance 10 in the steady state and diminished drying state phases will be explained more fully below.

During the steady state phase of the drying cycle, process air flows along the process air flowpath 58 and refrigerant flows along sealed system 80 as described above. Moreover, during the steady state phase of the drying cycle, controller 56 seeks to optimize (e.g., maximize) the moisture extraction rate and to match the evaporator capacity with the moisture extraction rate to maximize efficiency. To accomplish these goals, controller 56 is configured to receive an input indicative of a rate at which water is removed from the process air by conditioning system 40. Controller 56 is also configured to determine a moisture extraction rate indicative of a rate at which moisture is removed from articles LA within chamber 25 of drum 26 based at least in part on the rate at which water is removed from process air by conditioning system 40. Controller 56 is then configured to cause adjustment of one or more drying cycle settings based at least in part on the determined moisture extraction rate.

In some embodiments, the rate at which water is removed from the process air by conditioning system 40 is determined based at least in part on the pump activation frequency of drain pump 98. Accordingly, in such embodiments, as will be explained below, the input indicative of the rate at which water is removed from the process air by conditioning system 40 is descriptive of the pump activation frequency of drain pump 98. The pump activation frequency is indicative of a frequency at which drain pump 98 is activated to remove water from the collection tank 94. In such embodiments, controller 56 determines the moisture extraction rate based at least in part on the pump activation frequency.

An example manner in which controller 56 utilizes the pump activation frequency of drain pump 98 to ultimately control dryer appliance 10 in an efficient manner during a drying cycle will now be described. During a drying cycle, controller 56 receives an input indicative of a pump activation frequency of drain pump 98. For instance, controller 56 can include a timer that tracks when drain pump 98 is active or "on" and when drain pump 98 is deactivated or "off." In other embodiments, the timer can be offboard controller 56. When water within collection tank 94 has reached a predetermined level, drain pump 98 is activated so that collection tank 94 does not overfill. In some embodiments, drain pump 98 is communicatively coupled with sensor 96, and when sensor 96 detects that the water has reached the predetermined level, drain pump 98 can automatically remove or drain the water from collection tank 94. As controller 56 is communicatively coupled with drain pump 98, the timer of controller 56 can track the activation time of drain pump 98. In other embodiments, sensor 96 is communicatively coupled with controller 56. In such embodiments, when sensor 96 detects that the water has reached the predetermined level within collection tank 94, controller 56 can receive an input indicating that the predetermined level has been reached in collection tank 94, and accordingly, controller 56 can activate drain pump 98 to remove the water therefrom.

Figure 4:
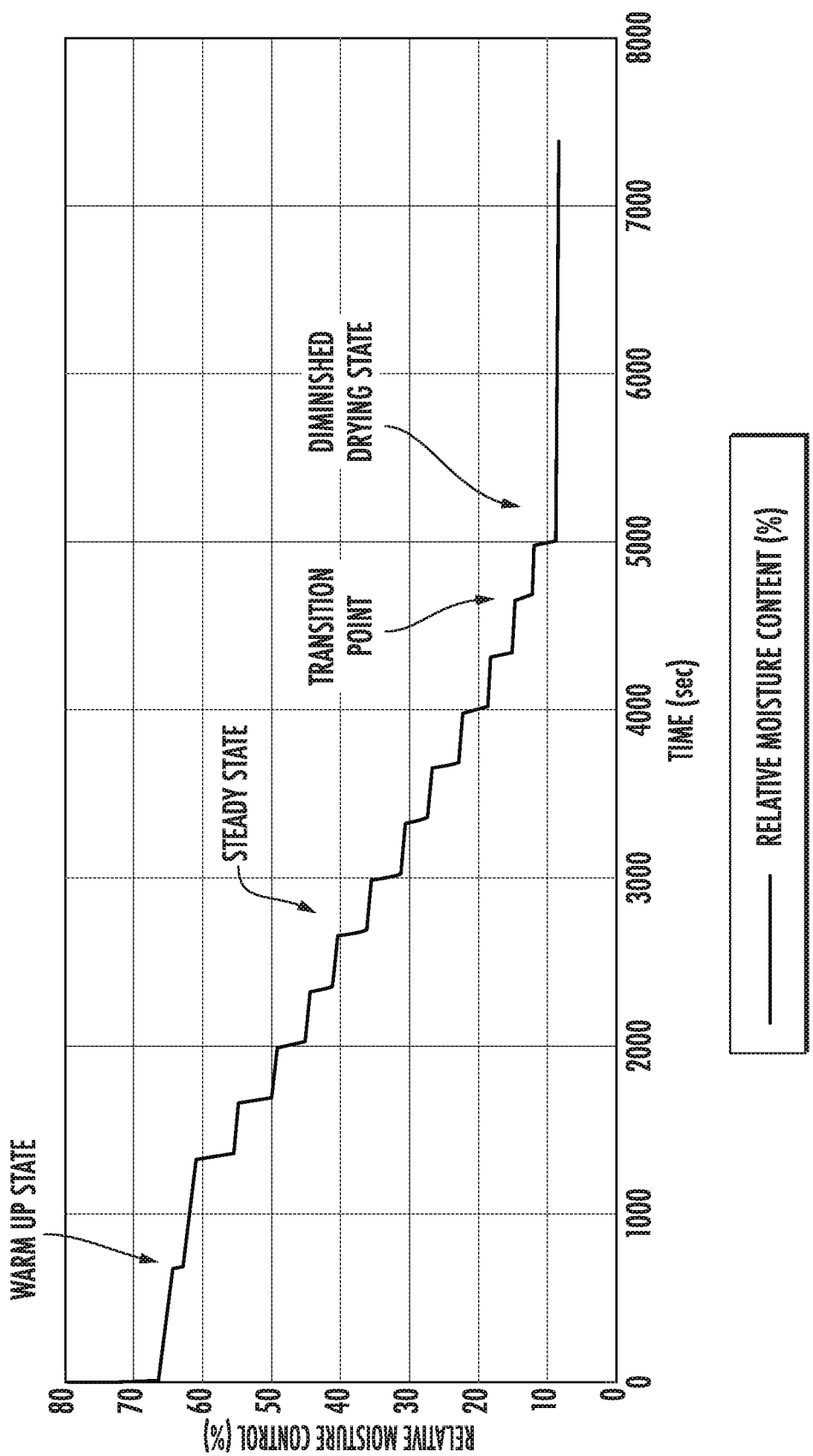
FIG. 4 provides a graph depicting a relative moisture content in articles being dried in a drying cycle versus time according to an exemplary embodiment of the present disclosure.

Drain pump 98 is activated intermittently throughout the steady state phase of the drying cycle to remove water from collection tank 94. For instance, as shown in FIG. 4, a graph depicting the relative moisture content in the articles being dried in a drying cycle versus time is provided, and as illustrated, the relative moisture content has a stepwise function representing that drain pump 98 is activated on and off to remove moisture content from dryer appliance 10. The vertical lines of the stepwise function represent the "pump out" or activation of drain pump 98. Generally, during steady state, the time periods between "pump outs" or the time between activation of drain pump 98 are relatively constant. Notably, the time between "pump outs" or activation times increase steadily during the diminished rate drying state.

Figure 5:
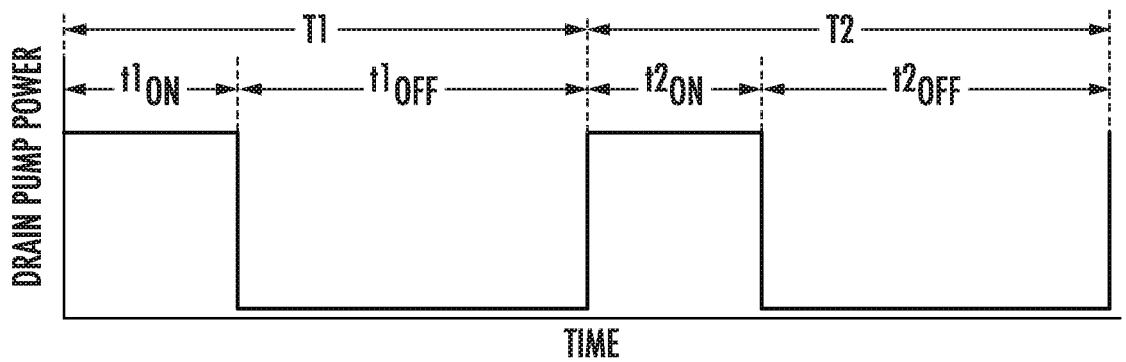
FIG. 5 provides a graph depicting drain pump power as a function of time according to an exemplary embodiment of the present disclosure.

The pump activation frequency of drain pump 98 received by controller 56, e.g., from the timer thereof, can be calculated by tracking the time period between "pump outs", the activation-to-activation total period, or by some other suitable method. For instance, FIG. 5 provides a graph depicting drain pump power as a function of time. As shown, in a first period T1 during a drying cycle, drain pump 98 is activated to remove water from collection tank 94 for a first activation time $t1_{ON}$ (e.g., when the water has reached a predetermined level in collection tank 94). Then, drain pump 98 is deactivated for a first deactivation time $t1_{OFF}$. In a second period T2 during the drying cycle, drain pump 98 is activated to remove water from collection tank 94 once again for a second activation time $t2_{ON}$ and is then deactivated for a second activation time $t2_{OFF}$. The activation times (e.g., $t1_{ON}$, $t2_{ON}$) of drain pump 98 can be held relatively constant. Accordingly, the time period between "pump outs" (e.g., the deactivation time $t1_{OFF}$, $t2_{OFF}$) is indicative of the drain activation frequency. Further, the activation-to-activation total period (e.g., the time period T1, T2) is also indicative of the drain activation frequency. Controller 56 can receive an input indicative of either the time period between "pump outs" or the activation-to-activation total periods.

Figure 6:
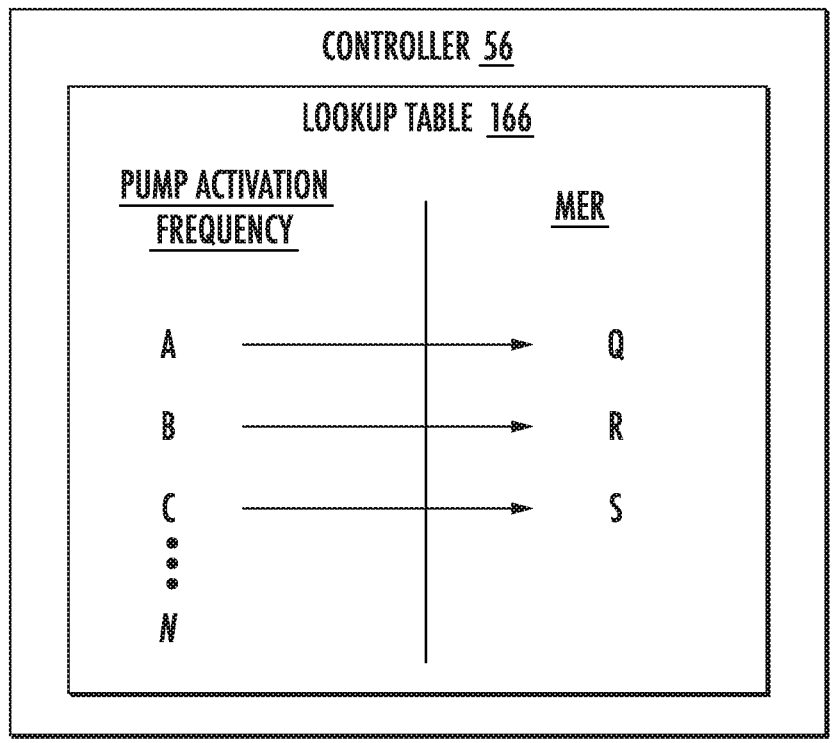
FIG. 6 provides an example lookup table according to an exemplary embodiment of the present disclosure.

After receiving the input indicative of the pump activation frequency of drain pump 98, controller 56 is configured to determine a moisture extraction rate based at least in part on the input indicative of the pump activation frequency. The moisture extraction rate is descriptive of a rate at which moisture is removed from articles within chamber 25 of drum 26. In some embodiments, as shown in FIG. 6, controller 56 can include a lookup table 100 that correlates pump activation frequency with moisture extraction rate (MER). For the depicted example, pump activation frequency "A" corresponds with moisture extraction rate "Q", pump activation frequency "B" corresponds with moisture extraction rate "R", and pump activation frequency "C" correspond with moisture extraction rate "S", and so on and so forth to the Nth pump activation frequency. Accordingly, for this example, in determining the moisture extraction rate, the pump activation frequency received as part of the input is correlated with a moisture extraction rate via a lookup table 100 of controller 56.

After determining the moisture extraction rate, controller 56 can cause adjustment of one or more drying cycle settings based at least in part on the determined moisture extraction rate. For instance, in some embodiments, in causing adjustment of the one or more drying cycle settings based at least in part on the determined moisture extraction rate, controller 56 is configured to cause adjustment of a mass flow rate of the refrigerant flowing along sealed system 80 based at least in part on the determined moisture extraction rate. This can be accomplished in a number of suitable ways.

As one example, in some embodiments, compressor 84 of sealed system 80 is a variable speed compressor operable to move the refrigerant along the sealed system at different mass flow rates. In such embodiments, in causing adjustment of the mass flow rate of the refrigerant flowing along sealed system 80 based at least in part on the determined moisture extraction rate, controller 56 is configured to cause the variable speed compressor 84 to adjust the mass flow rate of the refrigerant flowing along the sealed system based at least in part on the determined moisture extraction rate. For instance, controller 56 can cause variable speed compressor 84 to change speeds such that the mass flow rate increases or decreases depending on the determined moisture extraction rate.

As another example, in some embodiments, sealed system 80 has an electronic expansion valve, which can be expansion valve 88 or another expansion valve placed in series or parallel with expansion valve 88 along sealed system 80. The electronic expansion valve is operable to adjust a pressure of the refrigerant flowing along sealed system 80. In such embodiments, in causing adjustment of the mass flow rate of the refrigerant flowing along the sealed system based at least in part on the determined moisture extraction rate, controller is configured to cause the electronic expansion valve to adjust the pressure of the refrigerant flowing along the sealed system based at least in part on the determined moisture extraction rate. When the electronic expansion valve adjusts the pressure of the refrigerant, the mass flow rate of the refrigerant is adjusted. The pressure of the refrigerant can be adjusted such that the mass flow rate is increased or decreased depending on the determined moisture extraction rate.

As yet another example, sealed system 80 can include multiple evaporators (not shown) positioned in parallel in fluid communication with the process air flowpath 58, including a first evaporator and a second evaporator. One or more switching valves can be used to direct the flow of refrigerant across or through the evaporators to increase or decrease the evaporator capacity of sealed system 80, which ultimately adjusts the mass flow rate and can better balance the air side and refrigerant side loads.

Notably, the mass flow rate of the refrigerant flowing along sealed system 80 can be adjusted continuously, at predetermined intervals, or upon one or more trigger conditions (e.g., when the moisture extraction rate has reached a threshold) throughout the drying cycle to account for the diminishing moisture extraction rate over the course of the drying cycle. In this manner, controller 56 can iteratively adjust the mass flow rate of the refrigerant flowing through sealed system 80 throughout the drying cycle, particularly in the steady state and diminishing drying state phases of the drying cycle.

As noted, different fabrics of articles give off moisture at different rates and this is reflected in how fast condensate water fills into collection tank 94. As will be appreciated, it is beneficial to know the fabric type of the articles within chamber 25 of drum 26. Accordingly, in some embodiments, controller 56 is configured to determine a fabric type of articles disposed within chamber 25 of drum 26 based at least in part on the input indicative of the pump activation frequency. For instance, controller 56 can receive the input indicative of the pump activation frequency, e.g., in the manner noted herein. Thereafter, controller 56 can determine the moisture extraction rate based at least in part on the pump activation frequency, e.g., in the manner noted herein. Next, controller 56 is configured to determine the fabric type of articles disposed within chamber 25 of drum 26 based at least in part on the determined moisture extraction rate.

In some embodiments, before determining the fabric type, controller 56 must receive a predetermined number of inputs indicative of the pump activation frequency of drain pump 98, e.g., at least three discrete inputs indicative of the pump activation frequency of drain pump 98. In such embodiments, the pump activation frequencies of the predetermined number of inputs must be within a predetermined margin of one another, e.g., the frequency values must be within a 10% margin of one another. In this manner, controller 56 can ensure that dryer appliance 10 is operating in the steady state phase of the drying cycle, which can result in a more accurate fabric type determination.

After determining the fabric type of the articles LA within chamber 25 of drum 26, controller 56 causes adjustment of the one or more drying cycle settings based at least in part on the determined fabric type of articles disposed within chamber 25. Automatically adjusting one or more drying cycle settings based on the fabric type can offer a clothes drying benefit. As one example, in causing adjustment of the one or more drying cycle settings based at least in part on the determined fabric type of articles disposed within chamber 25 of drum 26, controller 56 is configured to cause adjustment of a drying cycle time of the drying cycle. For instance, a first fabric type may respond better to a shorter drying cycle time and a second fabric type may respond better to a longer drying cycle. Controller 56, or more generally dryer appliance 10, can include a timer that tracks the drying cycle time. As noted, the drying cycle time can be adjusted by controller 56 based at least in part on the determined fabric type.

As another example, in some embodiments, conditioning system 40 of dryer appliance 10 optionally includes an electric heater 102 positioned to provide heat to process air flowing along the process air flowpath 58, e.g., as shown in FIG. 3. Electrical heater 102 can receive electrical power (e.g., from a power source) and can generate heat based at least in part on the received electrical power. The generated heat can be imparted to the process air flowing along the process air flowpath 58. In such embodiments, in causing adjustment of the one or more drying cycle settings based at least in part on the determined fabric type of articles disposed within chamber 25, controller 56 is configured to cause electric heater 102 to adjust a heat input to the process air flowing along the process air flowpath 58. Causing electric heater 102 to impart thermal energy or heat to the process air may be particularly effective in the diminishing drying state of the drying cycle to achieve a desired final moisture content of the moisture in the articles.

With reference again to FIG. 4, as depicted, the time between "pump outs" or activation times are held relatively constant during the steady state phase of the drying cycle. Controller 56 can determine the average pump activation frequency over the course of the steady state phase. The average pump activation frequency can be used to determine when the drying cycle transitions from the steady state phase to the diminished dry state phase. Determining the transition point when the drying cycle transitions from the steady state phase to the diminished dry state phase can allow for automatic adjustment of one or more drying cycle settings. The transition point can be determined by controller 56 first determining the average pump activation frequency, e.g., during the steady state cycle phase. With the average pump activation frequency determined, controller 56 can determine whether the current pump activation frequency received as an input is not within a predetermined margin of the average pump activation frequency. For instance, suppose the predetermined margin is set at ±10% of the average pump activation frequency and the current pump activation frequency is determined not to be in the predetermined margin of the average pump activation frequency (e.g., the current pump activation frequency is within 12% of the average pump activation frequency), then controller 56 determines that the drying cycle has transitioned from the steady state phase to the diminished drying state phase. The transition point where the drying cycle transitions from the steady state phase to the diminished drying state phase is shown in FIG. 4.

During the diminished drying state phase of the drying cycle, process air flows along the process air flowpath 58 and refrigerant flows along sealed system 80 as described above. Determining the transition point when the drying cycle transitions from the steady state phase to the diminished dry state phase can allow for automatic adjustment of one or more drying cycle settings from settings that optimize the moisture extraction rate at evaporator 82 during steady state to settings that seek to deliver the desired final moisture content of the articles.

To accomplish these goals, controller 56 is configured to receive an input indicative of a pump activation frequency of drain pump 98. Controller 56 is also configured to determine a moisture extraction rate indicative of a rate at which moisture is removed from articles within chamber 25 of drum 26 based at least in part on the pump activation frequency. Controller 56 is then configured to cause adjustment of one or more drying cycle settings based at least in part on the determined moisture extraction rate.

As one example, in causing adjustment of the one or more drying cycle settings during the diminished drying state of the drying cycle based at least in part on the determined moisture extraction rate, controller 56 is configured to cause adjustment of a mass flow rate of the process air flowing along the process air flowpath 58. For instance, in adjustment of the mass flow rate of process air flowing along the process air flowpath 58 based at least in part on the determined moisture extraction rate, controller 56 is configured to cause blower fan 48 to adjust the mass flow rate of the process air flowing along the process air flowpath 58.

More particularly, controller 56 can be communicatively coupled with a blower fan motor 49 that is operable to drive blower fan 48. Blower fan motor 49 can be adjusted to a number of different settings, and consequently, blower fan 48 is adjustable between a plurality of speed settings. For instance, blower fan 48 can be adjustable between a first fan speed (the lowest fan speed), a second fan speed, a third fan speed, and a fourth fan speed (the highest fan speed). In other embodiments, blower fan 48 can be adjustable between more or less than four (4) blower fan speeds. Accordingly, blower fan 48 is a variable speed blower fan. By adjusting the fan speed of blower fan 48, the mass flow rate of the process air can be adjusted to enhance drying of the articles within chamber 25 of drum 26. For example, the fan speed of blower fan 48 can be decreased in the diminished drying state to allow the process air to more fully saturate as the air passes through chamber 25.

As another example, in causing adjustment of the one or more drying cycle settings during the diminished drying state of the drying cycle based at least in part on the determined moisture extraction rate, controller 56 is configured to cause an electronic expansion valve, which can be expansion valve 88 or another expansion valve positioned in series or parallel with expansion valve 88), to adjust the pressure of the refrigerant flowing along the sealed system 80. For instance, the electronic expansion valve can be moved to a closed position or more closed. This can increase the pressure on the high side of sealed system 80 and decrease the pressure on the low side of sealed system 80. Accordingly, the temperature of the refrigerant increases on the high side of sealed system 80 and the temperature of the refrigerant decreases on the low side of sealed system 80. That is, adjustment of the electronic expansion valve can drive higher temperatures in condenser 86 and can lower the temperature of the evaporator 82. This effectively increases the moisture carrying capacity of the process air flowing along the process air flowpath 58.

As yet another example, in causing adjustment of the one or more drying cycle settings during the diminished drying state of the drying cycle based at least in part on the determined moisture extraction rate, controller 56 is configured to cause electric heater 102 to adjust a heat input to the process air flowing along the process air flowpath 58. As noted, conditioning system 40 of dryer appliance 10 can optionally include electric heater 102 operable to provide heat to process air flowing along the process air flowpath 58, e.g., as shown in FIG. 3. Causing electric heater 102 to impart thermal energy or heat to the process air may be particularly effective in the diminishing drying state of the drying cycle to achieve a desired final moisture content of the moisture in the articles. That is, electric heater 102 can increase the drying rate by increasing the rate that water is pulled or extracted from the articles within chamber 25 of drum 26 to the process air.

As a further example, in causing adjustment of the one or more drying cycle settings during the diminished drying state of the drying cycle based at least in part on the determined moisture extraction rate, controller 56 is configured to diminish the evaporator capacity to match the current moisture extraction rate. In this way, efficiency of dryer appliance 10 can be improved in the diminished drying state phase of the drying cycle. Controller 56 can diminish the evaporator capacity to match the current moisture extraction rate by causing adjustment of the mass flow rate of the refrigerant flowing along sealed system 80. This can be accomplished in any manner described herein. For instance, controller 56 can cause variable speed compressor 84 to adjust the mass flow rate of the refrigerant flowing along the sealed system, e.g., by adjusting the electrical power provided thereto. Controller 56 can cause variable speed compressor 84 to change speeds such that the mass flow rate increases or decreases depending on the determined moisture extraction rate. In some embodiments, sealed system 80 can include multiple evaporators (not shown) positioned in parallel in fluid communication with the process air flowpath 58, including a first evaporator and a second evaporator. One or more switching valves can be used to direct the flow of refrigerant across or through the evaporators to increase or decrease the evaporator capacity of sealed system 80, which ultimately adjusts the mass flow rate to diminish the evaporator capacity to match the current moisture extraction rate.

In yet other embodiments, with reference to FIG. 3, the rate at which water is removed from the process air by conditioning system 40 is determined by controller 56 based at least in part on a measured flow rate of condensate water draining from the process air flowing through conditioning system 40 (e.g., proximate evaporator 82) to collection tank 94. Accordingly, in such embodiments, the input indicative of the rate at which water is removed from the process air by conditioning system 40 is descriptive of the flow rate of condensate water draining from the process air flowing through conditioning system 40 to collection tank 94. For instance, controller 56 can receive an input from a flow meter 104 positioned along drain line 92 as shown in FIG. 3. Flow meter 104 can be communicatively coupled with controller 56 (e.g., a suitable wired or wireless communication link). Moreover, flow meter 104 is operable to measure a flow rate of condensate water draining from the process air flowing through conditioning system 40 to collection tank 94. In such embodiments, controller 56 determines the moisture extraction rate based at least in part on the measured flow rate of condensate water draining from the process air flowing through conditioning system 40 to collection tank 92. With the moisture extraction rate determined, controller 56 can cause adjustment of the one or more drying cycle settings as described above, e.g., during the steady state and/or the diminished drying state of the drying cycle.

Figure 7:
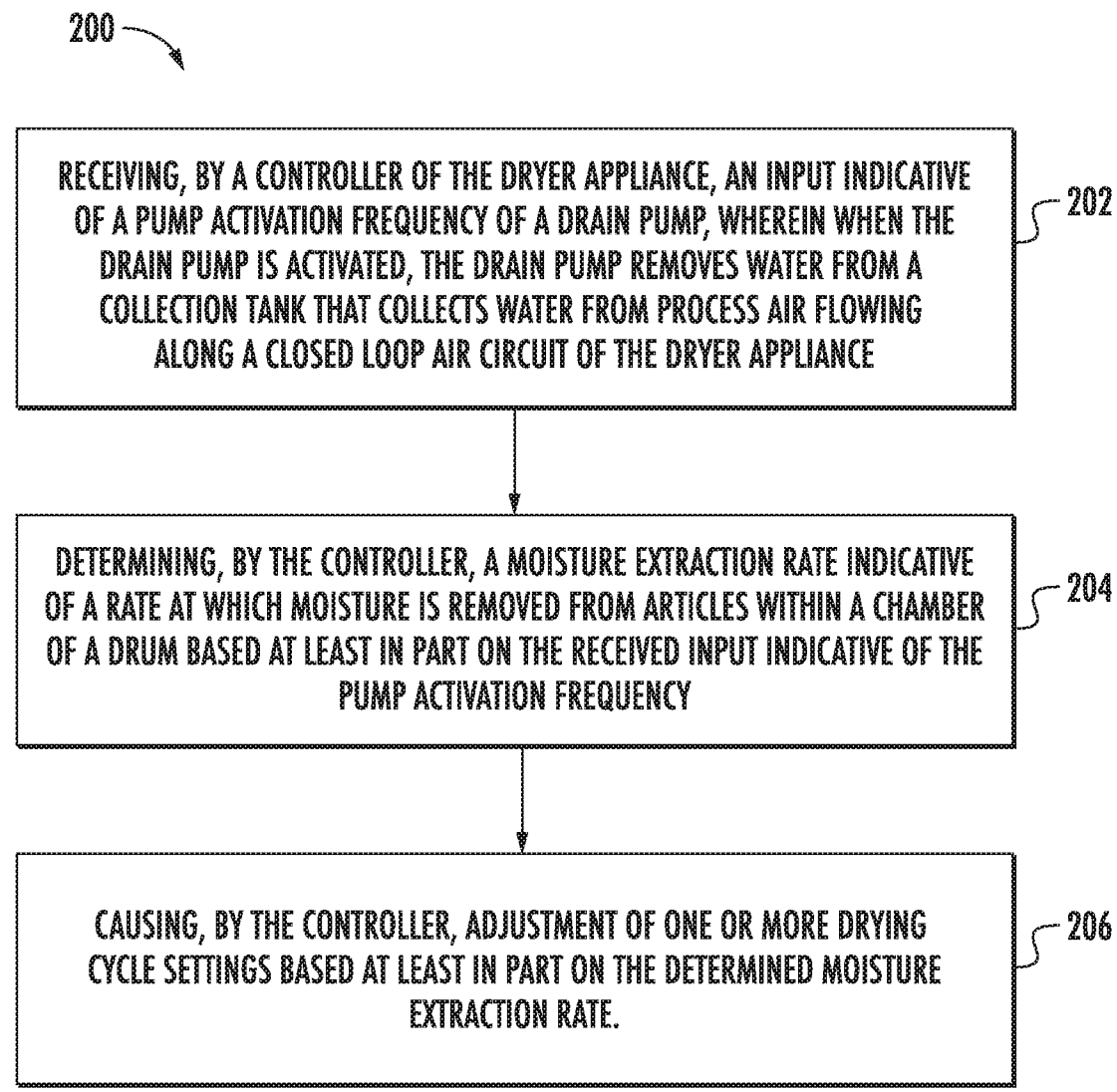
FIG. 7 provides a flow chart of an exemplary method of operating a dryer appliance in a drying cycle according to one or more embodiments of the present disclosure.

FIG. 7 provides a flow diagram of an example method (200) of operating a dryer appliance in a drying cycle. For instance, the dryer appliance 10 described herein can be operated as set forth in method (200). FIG. 7 depicts steps performed in a particular order for purposes of illustration and discussion. Those of ordinary skill in the art, using the disclosures provided herein, will understand that various steps of any of the methods disclosed herein can be modified in various ways without deviating from the scope of the present disclosure.

At (202), the method (200) includes receiving, by a controller of the dryer appliance, an input indicative of a pump activation frequency of a drain pump, wherein when the drain pump is activated, the drain pump removes water from a collection tank that collects water from process air flowing along a closed loop air circuit of the dryer appliance.

At (204), the method (200) includes determining, by the controller, a moisture extraction rate indicative of a rate at which moisture is removed from articles within a chamber of a drum based at least in part on the received input indicative of the pump activation frequency.

At (206), the method (200) includes causing, by the controller, adjustment of one or more drying cycle settings based at least in part on the determined moisture extraction rate. For instance, in some implementations, the dryer appliance has a conditioning system positioned along the closed loop air circuit for removing moisture from and imparting heat to process air flowing along the closed loop air circuit. For instance, the conditioning system can be the conditioning system 40 of FIG. 3. The conditioning system has a sealed system along which a refrigerant flows during the drying cycle. For instance, the sealed system can be the heat pump sealed system 80 of FIG. 3. In such implementations, causing, by the controller, adjustment of the one or more drying cycle settings based at least in part on the determined moisture extraction rate includes causing, by the controller, adjustment of a mass flow rate of the refrigerant flowing along the sealed system. The mass flow rate of the refrigerant flowing along the sealed system can be adjusted in any suitable manner noted herein.

Further, in some implementations, the method (200) includes iteratively receiving at (202), determining at (204), and causing at (206) during the drying cycle. In such implementations, the method (200) can further include determining, by the controller, an average pump activation frequency of the drain pump during a steady state phase of the drying cycle. The method (200) can also include receiving, by the controller of the dryer appliance, an input indicative of a current pump activation frequency of the drain pump. Next, the method (200) can include determining, by the controller, whether the current pump activation frequency is within a predetermined margin of the average pump activation frequency of the drain pump. When the current pump activation frequency is within the predetermined margin of the average pump activation frequency of the drain pump, the controller determines that the drying cycle has transitioned from the steady state phase to a diminished drying state phase of the drying cycle.

In some further implementations, the dryer appliance has a blower fan (e.g., blower fan 48) positioned along the closed loop air circuit for moving process air along the closed loop air circuit (e.g., process air flowpath 58 of FIG. 3). When the drying cycle has transitioned from the steady state phase to the diminished drying state phase of the drying cycle, the method (200) can further include causing, by the controller, adjustment of the one or more drying cycle settings based at least in part on the determined moisture extraction rate. Particularly, in some implementations, causing, by the controller, adjustment of the one or more drying cycle settings based at least in part on the determined moisture extraction rate includes causing, by the controller, a change in speed of the blower fan such that a mass flow rate of process air flowing along the closed loop air circuit is adjusted.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A dryer appliance, comprising:
a cabinet;
a drum rotatably mounted within the cabinet, the drum defining a chamber for receipt of articles for drying, the drum defining a drum outlet and a drum inlet to the chamber;
a conditioning system;
a duct system for providing fluid communication between the drum outlet and the conditioning system and between the conditioning system and the drum inlet, the duct system, the conditioning system, and the drum defining a process air flowpath;
a blower fan operable to move process air along the process air flowpath;
a collection tank in fluid communication with the conditioning system for receiving condensate water from process air flowing through the conditioning system;
a drain pump in fluid communication with the collection tank, the drain pump being operable to remove a volume of water from the collection tank;
a controller communicatively coupled with the drain pump, wherein during a drying cycle, the controller is configured to:
receive an input indicative of a rate at which water is removed from process air by the conditioning system, wherein the input indicative of the rate at which water is removed from process air by the conditioning system is descriptive of a pump activation frequency of the drain pump, the pump activation frequency being indicative of a frequency at which the drain pump is activated to remove water from the collection tank;

determine a moisture extraction rate indicative of a rate at which moisture is removed from articles within the chamber based at least in part on the received input indicative of the rate at which water is removed from process air by the conditioning system;

determine a fabric type of articles disposed within the chamber based at least in part on the pump activation frequency; and cause adjustment of one or more drying cycle settings based at least in part on the determined moisture extraction rate and on the determined fabric type of articles disposed within the chamber.

2. The dryer appliance of claim 1, further comprising:
a sensor operable to detect when water within the collection tank has reached a predetermined level, the sensor being communicatively coupled with the controller, and wherein the controller is further configured to:
receive, from the sensor, an input indicating that water within the collection tank has reached the predetermined level;

in response to the input indicating that water within the collection tank has reached the predetermined level, cause the drain pump to remove the volume of water from the collection tank.

3. The dryer appliance of claim 1, wherein the drying cycle includes a warm up state, a steady state, and a diminished drying state, and wherein the controller is configured to iteratively:

receive inputs indicative of the pump activation frequency of the drain pump;

determine the moisture extraction rate indicative of the rate at which moisture is removed from articles within the chamber based at least in part on the received inputs indicative of the pump activation frequency of the drain pump; and cause automatic adjustment of the one or more drying cycle settings based at least in part on the determined moisture extraction rate during at least the steady state and the diminished drying state of the drying cycle.

4. The dryer appliance of claim 3, wherein the steady state of the drying cycle is indicative of a part of the drying cycle in which an article water dissipation rate exceeds the moisture extraction rate, the article water dissipation rate being indicative of a rate at which articles within the chamber dissipate water to process air flowing along the process air flowpath, and wherein the diminished drying state of the drying cycle is indicative of a part of the drying cycle in which the moisture extraction rate exceeds the article water dissipation rate.

5. The dryer appliance of claim 1, further comprising:
a flow meter communicatively coupled with the controller and operable to measure a flow rate of condensate water draining from process air flowing through the conditioning system to the collection tank, wherein the input indicative of the rate at which water is removed from process air by the conditioning system is descriptive of the flow rate of condensate water draining from process air flowing through the conditioning system to the collection tank, and wherein the controller determines the moisture extraction rate based at least in part on the flow rate of condensate water draining from process air flowing through the conditioning system to the collection tank.

6. The dryer appliance of claim 1, wherein in causing adjustment of the one or more drying cycle settings based at least in part on the determined fabric type of articles disposed within the chamber, the controller is configured to:

cause adjustment of a drying cycle time of the drying cycle.

7. The dryer appliance of claim 1, wherein the conditioning system has an electric heater positioned to provide heat to process air flowing along the process air flowpath, and wherein in causing adjustment of the one or more drying cycle settings based at least in part on the determined fabric type of articles disposed within the chamber, the controller is configured to:

cause the electric heater to adjust a heat input to process air flowing along the process air flowpath.

8. The dryer appliance of claim 1, wherein the conditioning system has a sealed system along which a refrigerant flows, and wherein in causing adjustment of the one or more drying cycle settings based at least in part on the determined moisture extraction rate, the controller is configured to:

cause adjustment of a mass flow rate of the refrigerant flowing along the sealed system.

9. The dryer appliance of claim 8, wherein the sealed system has a variable speed compressor operable to move the refrigerant along the sealed system, and wherein in causing adjustment of the mass flow rate of the refrigerant flowing along the sealed system based at least in part on the determined moisture extraction rate, the controller is configured to:

cause the variable speed compressor to adjust the mass flow rate of the refrigerant flowing along the sealed system.

10. The dryer appliance of claim 8, wherein the sealed system has an electronic expansion valve operable to adjust a pressure of the refrigerant flowing along the sealed system, and wherein in causing adjustment of the mass flow rate of the refrigerant flowing along the sealed system based at least in part on the determined moisture extraction rate, the controller is configured to:

cause the electronic expansion valve to adjust the pressure of the refrigerant flowing along the sealed system based at least in part on the determined moisture extraction rate, wherein when the electronic expansion valve adjusts the pressure of the refrigerant, the mass flow rate of the refrigerant is adjusted.

11. The dryer appliance of claim 1, wherein in causing adjustment of the one or more drying cycle settings based at least in part on the determined moisture extraction rate, the controller is configured to:

cause adjustment of a mass flow rate of process air flowing along the process air flowpath.

12. The dryer appliance of claim 11, wherein in adjustment of a mass flow rate of process air flowing along the process air flowpath based at least in part on the determined moisture extraction rate, the controller is configured to:

cause the blower fan to adjust the mass flow rate of process air flowing along the process air flowpath based at least in part on the determined moisture extraction rate.

13. The dryer appliance of claim 12, wherein the controller is further configured to:

determine a fabric type of articles disposed within the chamber based at least in part on the pump activation frequency, and wherein the controller causes adjustment of the mass flow rate of the working fluid flowing along the sealed system based at least in part on the determined fabric type of articles disposed within the chamber.

14. A dryer appliance, comprising:
a cabinet;
a drum rotatably mounted within the cabinet, the drum defining a chamber for receipt of articles for drying, the drum defining a drum outlet and a drum inlet to the chamber;
a conditioning system having a sealed system along which a working fluid flows;
a duct system for providing fluid communication between the drum outlet and the conditioning system and between the conditioning system and the drum inlet, the duct system, the conditioning system, and the drum defining a process air flowpath;
a blower fan operable to move process air along the process air flowpath;
a collection tank in fluid communication with the conditioning system for receiving condensate water from process air flowing through the conditioning system;
a drain pump in fluid communication with the collection tank and operable to remove a volume of water from the collection tank; and
a controller communicatively coupled with the drain pump, and during a drying cycle, the controller is configured to:
receive an input indicative of a pump activation frequency of the drain pump;
determine a moisture extraction rate indicative of a rate at which moisture is removed from articles within the chamber based at least in part on the pump activation frequency; and
cause adjustment of a mass flow rate of the working fluid flowing along the sealed system based at least in part on the determined moisture extraction rate.

15. A method of operating a dryer appliance in a drying cycle, the method comprising:
receiving, by a controller of the dryer appliance, an input indicative of a pump activation frequency of a drain pump, wherein when the drain pump is activated, the drain pump removes water from a collection tank that collects water from process air flowing along a closed loop air circuit of the dryer appliance;
determining, by the controller, a moisture extraction rate indicative of a rate at which moisture is removed from articles within a chamber of a drum based at least in part on the received input indicative of the pump activation frequency; and
causing, by the controller, adjustment of one or more drying cycle settings based at least in part on the determined moisture extraction rate.

16. The method of claim 15, wherein the method includes iteratively receiving, determining, and causing during the drying cycle, and wherein the method further comprises:
determining, by the controller, an average pump activation frequency of the drain pump during a steady state phase of the drying cycle;
receiving, by the controller of the dryer appliance, an input indicative of a current pump activation frequency of the drain pump;
determining, by the controller, whether the current pump activation frequency is within a predetermined margin of the average pump activation frequency of the drain pump, and
wherein when the current pump activation frequency is within the predetermined margin of the average pump activation frequency of the drain pump, the controller determines that the drying cycle has transitioned from the steady state phase to a diminished drying state phase of the drying cycle.

17. The method of claim 16, wherein the dryer appliance has a blower fan positioned along the closed loop air circuit for moving process air along the closed loop air circuit, and wherein when the drying cycle has transitioned from the steady state phase to the diminished drying state phase of the drying cycle, the method further comprises:
causing, by the controller, adjustment of the one or more drying cycle settings based at least in part on the determined moisture extraction rate, and
wherein causing, by the controller, adjustment of the one or more drying cycle settings based at least in part on the determined moisture extraction rate comprises causing, by the controller, a change in speed of the blower fan such that a mass flow rate of process air flowing along the closed loop air circuit is adjusted.

18. The method of claim 15, wherein the dryer appliance has a conditioning system positioned along the closed loop air circuit for removing moisture from and imparting heat to process air flowing along the closed loop air circuit, the conditioning system having a sealed system along which a refrigerant flows during the drying cycle, and wherein causing, by the controller, adjustment of the one or more drying cycle settings based at least in part on the determined moisture extraction rate comprises:
causing, by the controller, adjustment of a mass flow rate of the refrigerant flowing along the sealed system.

* * * * *